(12) United States Patent
Wang et al.

(10) Patent No.: US 11,920,216 B2
(45) Date of Patent: Mar. 5, 2024

(54) PREPARATION METHOD OF SILVER NANOWIRE WITH CIRCULAR CROSS SECTION

(71) Applicant: NUOVO FILM SUZHOU CHINA INC., Suzhou (CN)

(72) Inventors: Xinyuan Wang, Suzhou (CN); Xubin Gao, Suzhou (CN); Yingjie Peng, Suzhou (CN); Hakfei Poon, Suzhou (CN)

(73) Assignee: NUOVO FILM SUZHOU CHINA INC., Suzhou (CN)

( * ) Notice: Subject to any disclaimer, the term of this patent is extended or adjusted under 35 U.S.C. 154(b) by 696 days.

(21) Appl. No.: 17/089,032

(22) Filed: Nov. 4, 2020

(65) Prior Publication Data
US 2021/0046544 A1    Feb. 18, 2021

Related U.S. Application Data

(63) Continuation of application No. PCT/CN2018/091554, filed on Jun. 15, 2018.

(30) Foreign Application Priority Data

Jun. 7, 2018    (CN) .................. 201810583254.9

(51) Int. Cl.
    *B22F 9/16*        (2006.01)
    *B22F 1/054*      (2022.01)
    (Continued)

(52) U.S. Cl.
    CPC .......... *C22C 1/0466* (2013.01); *B22F 1/0547* (2022.01); *B22F 1/07* (2022.01);
    (Continued)

(58) Field of Classification Search
None
See application file for complete search history.

(56) References Cited

U.S. PATENT DOCUMENTS

2005/0056118 A1*   3/2005   Xia ..................... B22F 1/0549
                                                           75/330
2010/0078602 A1*   4/2010   Hosoya ................... H01B 1/22
                                                           252/514

(Continued)

FOREIGN PATENT DOCUMENTS

CN          102667969 A      9/2012
CN          103447546 A     12/2013
(Continued)

OTHER PUBLICATIONS

Hwang, J. et al., "Enhancing the optical properties of silver nanowire transparent conducting electrodes by the modification of nanowire cross-section using ultra-violet illumination", Journal of Applied Physics, vol. 120, pp. 174903-1-174903-6, published online Nov. 3, 2016.*

(Continued)

*Primary Examiner* — George Wyszomierski
(74) *Attorney, Agent, or Firm* — Westbridge IP LLC (57) ABSTRACT

Embodiments of the present application provide a preparation method of a silver nanowire with a circular cross section, which relates to the field of nanometre material technologies. In the embodiments of the present application, by heating a mixed solution of the silver nanowire with the pentagonal cross section, the reducing sugar, the oxygen reducing agent and the water, an unstable silver nanowire (Continued)

---

110 — Mixing a silver nanowire with a pentagonal cross section, a reducing sugar, an oxygen reducing agent and water uniformly to form an aqueous solution 120 — Heating the aqueous solution at a preset temperature for a preset time to form a reaction product including the silver nanowire with the circular cross section with the pentagonal cross section are transformed into a stable silver nanowire with the circular cross section, and then the risk that a transparent conductive films based on the silver nanowires lose conductivity is avoided. In addition, in terms of an optical performance testing, compared to conductive films based on the silver nanowires with the pentagonal cross section, conductive films based on the silver nanowires with the circular cross section have significantly reduced a haze.

20 Claims, 5 Drawing Sheets

(51) Int. Cl.
*B22F 1/07* (2022.01)
*B22F 1/102* (2022.01)
*B22F 1/145* (2022.01)
*C22C 1/04* (2023.01)
*B82Y 30/00* (2011.01)
*B82Y 40/00* (2011.01)

(52) U.S. Cl.
CPC .............. *B22F 1/102* (2022.01); *B22F 1/145* (2022.01); *B22F 9/16* (2013.01); *B22F 2301/255* (2013.01); *B22F 2304/054* (2013.01); *B82Y 30/00* (2013.01); *B82Y 40/00* (2013.01)

(56) References Cited

U.S. PATENT DOCUMENTS

| | | | |
|---|---|---|---|
| 2011/0088511 A1 | 4/2011 | Jalaledin et al. | |
| 2015/0321257 A1* | 11/2015 | Suh | C22C 5/06 252/514 |
| 2016/0082418 A1* | 3/2016 | Qin | B01J 37/0225 502/330 |
| 2016/0167136 A1 | 6/2016 | Kotov et al. | |
| 2017/0139514 A1* | 5/2017 | Kim | H01B 1/22 |

FOREIGN PATENT DOCUMENTS

| | | |
|---|---|---|
| CN | 103878387 A | 6/2014 |
| CN | 104874790 A | 9/2015 |
| WO | WO-2011/078305 A1 * | 6/2011 |

OTHER PUBLICATIONS

English translation of WO-2011/078305 (originally published Jun. 30, 2011), obtained from PE2E search.*
First Office Action issued in counterpart Chinese Patent Application No. 201810583254.9, dated Mar. 25, 2019.
International Search Report issued in corresponding PCT Application No. PCT/CN2018/091554, dated Feb. 28, 2019.
Written Opinion issued in corresponding PCT Application No. PCT/CN2018/091554, dated Feb. 28, 2019.

* cited by examiner

Mixing a silver nanowire with a pentagonal cross section, a reducing sugar, an oxygen reducing agent and water uniformly to form an aqueous solution ⸺ 110

Heating the aqueous solution at a preset temperature for a preset time to form a reaction product including the silver nanowire with the circular cross section ⸺ 120

PREPARATION METHOD OF SILVER NANOWIRE WITH CIRCULAR CROSS SECTION

CROSS-REFERENCE TO RELATED APPLICATIONS

This application is a continuation of International Application No. PCT/CN2018/091554 filed on Jun. 15, 2018, which claims priority to Chinese patent application No. 201810583254.9 filed on Jun. 7, 2018, and the entire contents of the both applications are incorporated herein by reference.

TECHNICAL FIELD

The present application relates to the field of nanometre material technologies, and in particularly to a preparation method of silver nanowire with circular cross section.

BACKGROUND

At present, transparent conductive films based on silver nanowires have excellent electrical conductivity, transmittance and bendability, therefore the transparent conductive films are most probable to replace Indium Tin Oxide (ITO) films in various electronic components. However, currently synthesized silver nanowires mainly have a pentagonal cross section, and the silver nanowires with the pentagonal cross section are unstable and a conductive film formed by the silver nanowires with the pentagonal cross section has a high haze. In the event that there is an oxygen, a sulfide or a moisture in the surrounding environment, a significantly aging of the conductive film based on the silver nanowires with the pentagonal cross section may be observed, and thus there is a risk that the conductive film based on the silver nanowires with the pentagonal cross section loses the conductivity.

Therefore, how to improve a stability of the synthesized silver nanowires is an urgent problem to be solved.

SUMMARY

In view of this, embodiments of the present application provide a silver nanowire with a circular cross section to solve the problem that a synthesized silver nanowire in the prior art is unstable.

One aspect of the present application provides a preparation method of the silver nanowire with the circular cross section, including: mixing a silver nanowire with a pentagonal cross section, a reducing sugar, an oxygen reducing agent and water uniformly to form an aqueous solution; and heating the aqueous solution at a preset temperature for a preset time to form a reaction product including the silver nanowire with the circular cross section.

In an embodiment of the present application, a mass percentage of the silver nanowire with the pentagonal cross section in the aqueous solution is between 0.001% and 16%.

In an embodiment of the present application, a mass percentage of the silver nanowire with the pentagonal cross section in the aqueous solution is between 0.008% and 0.032%.

In an embodiment of the present application, an aspect ratio of the silver nanowire with the pentagonal cross section is greater than 10.

In an embodiment of the present application, a diameter of the silver nanowire with the pentagonal cross section is between 18 nm and 100 nm, and a length of the silver nanowire with the pentagonal cross section is between 5 um and 100 um.

In an embodiment of the present application, a surface of the silver nanowire with the pentagonal cross section is coated with polyvinylpyrrolidone (PVP); or the mixing a silver nanowire with a pentagonal cross section, a reducing sugar, an oxygen reducing agent and water uniformly includes: mixing the silver nanowire with the pentagonal cross section, the reducing sugar, the oxygen reducing agent polyvinylpyrrolidone and the water uniformly.

In an embodiment of the present application, a thickness of the polyvinylpyrrolidone coated on the surface of the silver nanowire with the pentagonal cross section is between 1 nm and 5 nm.

In an embodiment of the present application, the reducing sugar includes at least one of glucose, fructose, ribose, sucrose, maltose, lactose and starch.

In an embodiment of the present application, a mass percentage of the reducing sugar in the aqueous solution is between 0.1% and 35%.

In an embodiment of the present application, a mass percentage of the reducing sugar in the aqueous solution is between 0.35% and 3.5%.

In an embodiment of the present application, the oxygen reducing agent includes catechol.

In an embodiment of the present application, a mass percentage of the oxygen reducing agent in the aqueous solution is between 0.01% and 1%.

In an embodiment of the present application, the preset temperature is between 120° C. and 160° C.

In an embodiment of the present application, the preset temperature is 120° C., 140° C. or 160° C.

In an embodiment of the present application, the preset time is between 2 hours and 8 hours.

In an embodiment of the present application, the preset time is 2 hours or 4 hours.

In an embodiment of the present application, the reaction product is produced in an autoclave.

In an embodiment of the present application, a lining material of the autoclave is polytetrafluoroethylene.

In an embodiment of the present application, the silver nanowire with the pentagonal cross section is an aqueous dispersion, and a mass percentage of the silver nanowire with the pentagonal cross section in the aqueous dispersion is 0.16%. A mass percentage of the aqueous dispersion of the silver nanowire with the pentagonal cross section in the aqueous solution is 8.96%, a mass percentage of the reducing sugar in the aqueous solution is 1.40%, a mass percentage of the oxygen reducing agent in the aqueous solution is 0.09%, a mass percentage of the water in the aqueous solution is 89.56%, the preset temperature is 140° C. or 120° C., and the preset time is 4 hours; or the mass percentage of the aqueous dispersion of the silver nanowire with the pentagonal cross section in the aqueous solution is 8.99%, the mass percentage of the reducing sugar in the aqueous solution is 1.05%, the mass percentage of the oxygen reducing agent in the aqueous solution is 0.09%, the mass percentage of the water in the aqueous solution is 89.87%, the preset temperature is 140° C., and the preset time is 4 hours; or the mass percentage of the aqueous dispersion of the silver nanowire with the pentagonal cross section in the aqueous solution is 9.02%, the mass percentage of the reducing sugar in the aqueous solution is 0.70%, the mass percentage of the oxygen reducing agent in the aqueous solution is 0.09%, the mass percentage of the water in the aqueous solution is 90.19%, the preset temperature is 140°

C., and the preset time is 4 hours; or the mass percentage of the aqueous dispersion of the silver nanowire with the pentagonal cross section in the aqueous solution is 9.05%, the mass percentage of the reducing sugar in the aqueous solution is 0.35%, the mass percentage of the oxygen reducing agent in the aqueous solution is 0.09%, the mass percentage of the water in the aqueous solution is 90.51%, the preset temperature is 140° C., and the preset time is 4 hours; or the mixing a silver nanowire with a pentagonal cross section, a reducing sugar, an oxygen reducing agent and water uniformly includes: mixing the aqueous dispersion of the silver nanowire with the pentagonal cross section, the reducing sugar, the oxygen reducing agent, polyvinylpyrrolidone and the water uniformly, wherein the mass percentage of the aqueous dispersion of the silver nanowire with the pentagonal cross section in the aqueous solution is 8.95%, the mass percentage of the reducing sugar in the aqueous solution is 1.40%, the mass percentage of the oxygen reducing agent in the aqueous solution is 0.09%, the mass percentage of the water in the aqueous solution is 89.50%, the mass percentage of the polyvinylpyrrolidone in the aqueous solution is 0.07%, the preset temperature is 120° C., and the preset time is 4 hours; or the mass percentage of the aqueous dispersion of the silver nanowire with the pentagonal cross section in the aqueous solution is 8.96%, the mass percentage of the reducing sugar in the aqueous solution is 1.40%, the mass percentage of the oxygen reducing agent in the aqueous solution is 0.09%, the mass percentage of the water in the aqueous solution is 89.56%, the preset temperature is 160° C., and the preset time is 2 hours or 4 hours; or the mass percentage of the aqueous dispersion of the silver nanowire with the pentagonal cross section in the aqueous solution is 8.96%, the mass percentage of the reducing sugar in the aqueous solution is 1.40%, the mass percentage of the oxygen reducing agent in the aqueous solution is 0.01%, the mass percentage of the water in the aqueous solution is 89.63%, the preset temperature is 140° C., and the preset time is 4 hours; or the mass percentage of the aqueous dispersion of the silver nanowire with the pentagonal cross section in the aqueous solution is 8.96%, the mass percentage of the reducing sugar in the aqueous solution is 1.40%, the mass percentage of the oxygen reducing agent in the aqueous solution is 0.00%, the mass percentage of the water in the aqueous solution is 89.64%, the preset temperature is 140° C., and the preset time is 4 hours.

In an embodiment of the present application, the preparation method further includes: cooling the reaction product.

In an embodiment of the present application, a method for cooling is a natural cooling in the air.

In an embodiment of the present application, the preparation method further includes: washing the reaction product.

In an embodiment of the present application, a method for washing is centrifugal washing, in which a solution is deionized water, a rotation speed of the centrifugal washing is 4500 RPM, and the number of the centrifugal washing is three times.

In the embodiments of the present application, by heating a mixed solution of the silver nanowire with the pentagonal cross section, the reducing sugar, the oxygen reducing agent and the water, an unstable silver nanowire with the pentagonal cross section are transformed into a stable silver nanowire with the circular cross section, and then a haze of the transparent conductive films based on the silver nanowire is reduced and the risk that the transparent conductive films based on the silver nanowire lose conductivity is avoided. In addition, it is easy to obtain the above raw materials, and it is easy to obtain the silver nanowire with the circular cross section by using the preparation method.

DETAILED DESCRIPTION OF THE EMBODIMENTS

To make the purpose, technical means and advantages of the present application clearer, the application will hereafter be described in conjunction with the appended drawings. Obviously, the described embodiments are only a part of the embodiments of the present application, not all of the embodiments. Based on the embodiments in the present application, all other embodiments obtained by those skilled in the art without creative efforts shall fall within the protection scope of the present application.

Figure 1:
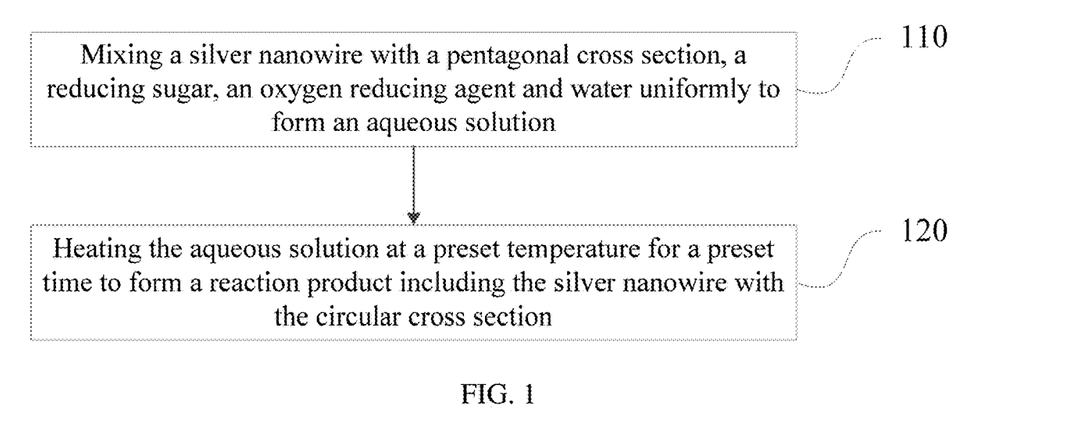
FIG. 1 is a flow schematic diagram of a preparation method of a silver nanowire with a circular cross section according to an embodiment of the present application.

FIG. 1 is a flow schematic diagram of a preparation method of a silver nanowire with a circular cross section according to an embodiment of the present application.

Step 110, mixing a silver nanowire with a pentagonal cross section, a reducing sugar, an oxygen reducing agent and water uniformly to form an aqueous solution.

Specifically, the silver nanowire with the pentagonal cross section, the reducing sugar, the oxygen reducing agent, and the water may be mixed uniformly by manual method, automatic method, or semi-automatic method, and the method is not limited here. For example, in an automatic mixing process, the above mentioned raw materials may be mixed by mechanical stirring equipment, air stirring equipment, magnetic stirring equipment, etc. In a manual mixing process, the above mentioned raw materials may be manually stirred and mixed by a stirring rod. The semi-automatic mixing method may be realized with a mixing device combining the manual mixing and the automatic mixing. It should be understood that the stirring and heating process may also be in one device which is not limited here.

Among the above raw materials, the reducing sugar may be sugars with reducing properties, for example, any one or more combinations of glucose, fructose, galactose, lactose, maltose, glycerol, mannose, ribose, sucrose, and starch, and the reducing sugar is not limited here. Under a high pressure and a high temperature conditions, the reducing sugar may adsorb on a surface of the silver nanowire with the pentagonal cross section, and prevent the silver nanowire from being attacked by oxygen atoms and from being broken. At the same time, the silver nanowire with the pentagonal cross section can generate atomic rearrangement at a high temperature, and silver atoms at the boundary of the silver nanowire are more active, thus finally a more stable silver nanowire with a circular cross section is formed. The oxygen reducing agent may be used for reducing oxygen atoms on a surface of the silver nanowire with the circular cross section and/or the silver nanowire with the pentagonal cross section, that is, the oxygen atoms on the surface are consumed. For example, the oxygen atoms may be oxygen molecules, etc adsorbing on the surface of the silver nanowire, thereby the silver nanowire is protected from being attacked by oxygen atoms and from being broken. The oxygen reducing agent may be at least one of catechol, a divalent or monovalent copper ions source, a trivalent or divalent iron ions source, etc., which is not limited here. Water may provide a solution environment for a conversion of the silver nanowire with the circular cross section. Here, the water refers to water without incidental impurities, for example, it may be at least one of deionized water, distilled water, ultrapure water, etc., which is not limited here.

In addition, mass percentages of various components in the above raw materials are not limited here. For example, the mass percentages of various components in the above raw materials may be that: the mass percentage of the silver nanowire with the pentagonal cross section is between 0.001% and 16%, the mass percentage of the reducing sugar is between 0.1% and 35%, and the mass percentage of the oxygen reducing agent is between 0.01% and 1%. Specifically, the specification of the silver nanowire with the pentagonal cross section may preferably have an aspect ratio greater than 10. The silver nanowire with the pentagonal cross section may be purchased directly from a third party or prepared in advance. There is no limitation on the method of obtaining the silver nanowire with the pentagonal cross section. In addition, before mixing, as long as a production of the reaction product is not limited, there is no limitation on the throwing order of the various components here.

In an embodiment of the present invention, in order to prevent a fracture and an aggregation of the silver nanowire with the pentagonal cross section, the surface of the silver nanowire with the pentagonal cross section may be coated with polyvinylpyrrolidone (PVP), or in Step 110, the mixing a silver nanowire with a pentagonal cross section, a reducing sugar, an oxygen reducing agent and water uniformly may include: mixing the silver nanowire with the pentagonal cross section, the reducing sugar, the oxygen reducing agent, the polyvinylpyrrolidone and the water uniformly.

Step 120, heating the aqueous solution at a preset temperature for a preset time to form a reaction product including the silver nanowire with the circular cross section.

Specifically, the above mentioned aqueous solution may be heated at the preset temperature for the preset time by a heating device, so as to form the reaction product including the silver nanowire with the circular cross section. Further, the above mentioned heating device may be a device for providing a constant heating temperature, a device for providing a heating temperature with a preset changing rule, or a device for providing a preset production method. There is no limitation on this here. For example, the above heating device may be a device providing hydrothermal preparation, or in addition to the heating function, the above heating device may also provide a sealed high pressure reaction environment, etc. The above heating device may be a set of device or a combination of multiple sets of device.

Here, the preset temperature may be a temperature that can provide a energy to convert the silver nanowire with the pentagonal cross section into the silver nanowire with the circular cross section, and the preset time may be a time that can ensure most of the silver nanowire with the pentagonal cross section being converted to the silver nanowire with the circular cross section. There is no limitation on a range of the preset temperature and the preset time.

It should be understood that the above preparation method may also include other steps, for example, cooling, washing, separation, drying, etc., which are not limited here.

In the embodiment of the present application, by heating the mixed solution of the silver nanowire with the pentagonal cross section, the reducing sugar, the oxygen reducing agent and the water, an unstable silver nanowire with the pentagonal cross section is transformed into a stable silver nanowire with the circular cross section, and then the haze of the transparent conductive films based on the silver nanowire is reduced and the risk that the transparent conductive films based on the silver nanowire lose conductivity is avoided. In addition, it is easy to obtain the above raw materials, and it is easy to obtain the silver nanowire with the circular cross section by using the preparation method.

Figure 2:
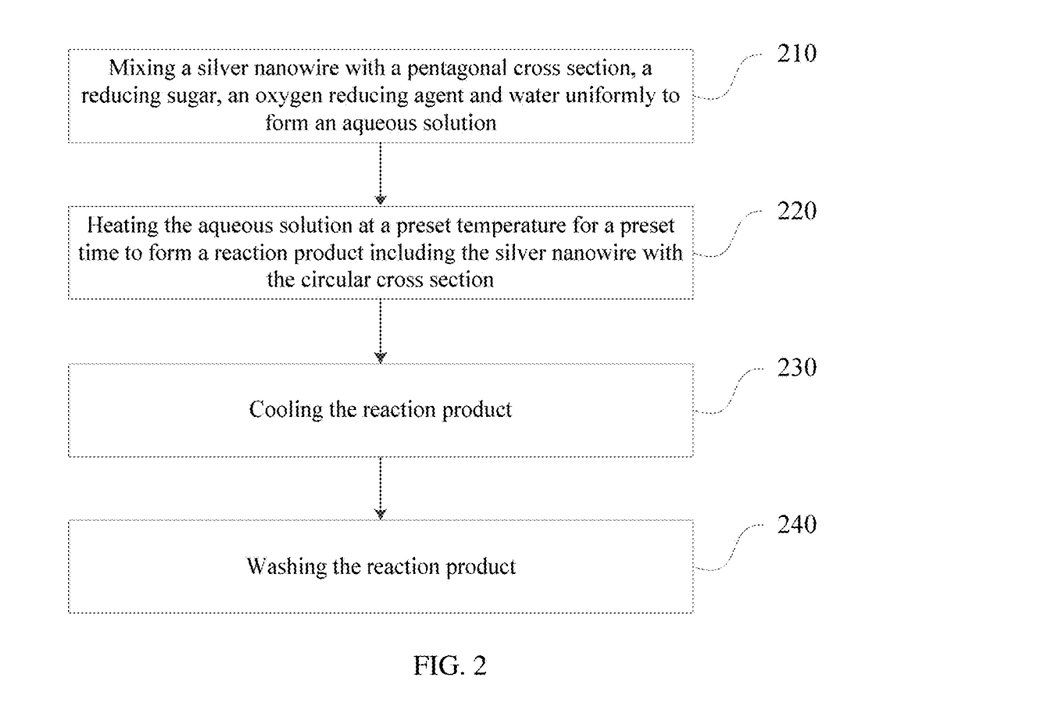
FIG. 2 is a flow schematic diagram of a preparation method of a silver nanowire with a circular cross section according to another embodiment of the present application.

FIG. 2 is a flow schematic diagram of a preparation method of a silver nanowire with a circular cross section according to another embodiment of the present application.

Step 210, mixing a silver nanowire with a pentagonal cross section, a reducing sugar, an oxygen reducing agent and water uniformly to form an aqueous solution.

Specifically, the preparation method of the silver nanowire with the circular cross section may preferably be a hydrothermal method. A production equipment of the reaction product may preferably be a sealed autoclave, and the sealed autoclave may preferably have polytetrafluoroethylene as lining material, which may be called a sealed polytetrafluoroethylene autoclave in the following.

For the four components of the above mentioned raw materials, a diameter of the silver nanowire with the pentagonal cross section may preferably be between 18 nm and 100 nm, and a length of the silver nanowire with the pentagonal cross section may preferably be between 5 um and 100 um. In addition, a surface of the silver nanowire with the pentagonal cross section may be coated with polyvinylpyrrolidone, and a thickness of which may preferably be between 1 nm and 5 nm. A mass percentage of the silver nanowire with the pentagonal cross section in the above mentioned aqueous solution may preferably be 0.008% to 0.032%. The reducing sugar, preferably, may be glucose. A mass percentage of the reducing sugar in the above mentioned aqueous solution may preferably be between 0.35% and 3.5%. The oxygen reducing agent, preferably, may be catechol. A mass percentage of the oxygen reducing agent in the above mentioned aqueous solution may preferably be between 0.01% and 1%. The water may preferably be deionized water.

Step 220, heating the aqueous solution at a preset temperature for a preset time to form a reaction product including the silver nanowire with the circular cross section.

Specifically, the above mentioned aqueous solution may be transferred to the sealed polytetrafluoroethylene autoclave after being uniformly mixed. Preferably, the preset temperature of heating may be between 120° C. and 160° C., and the preset time of heating may be between 2 hours and 8 hours.

Step 230, cooling the reaction product.

After the reaction product is formed, preferably, the autoclave may be naturally cooled in the air.

Step 240, washing the reaction product.

After the cooling is completed, the washing method used for the reaction product may preferably be a centrifugal washing. Further, a solution used in the centrifugal washing is preferably the deionized water, a rotation speed of the centrifugal washing is preferably 4500 RPM, and the number of the centrifugal washing is preferably three times, so as to obtain a purified silver nanowire with a circular cross section.

In addition, the description of other details, steps or features in Step 210 and Step 220 may reference the embodiment of FIG. 1 to avoid repetition, and details are not repeated here.

Embodiments of the present application will be described in the following in conjunction with specific examples.

Figure 3:
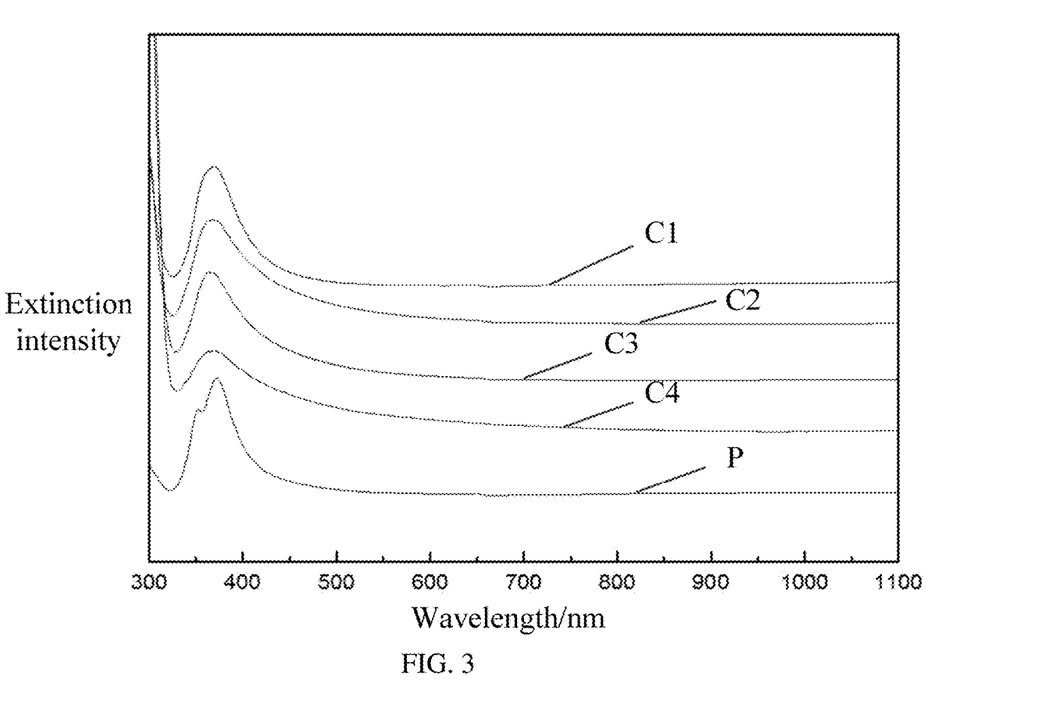
FIG. 3 is a schematic diagram of ultraviolet-visible extinction spectrums of reaction products of glucose with different concentrations and silver nanowires with a pentagonal cross section.

FIG. 3 is a schematic diagram of ultraviolet-visible extinction spectrums of reaction products of glucose with different concentrations and silver nanowires with a pentagonal cross section.

In order to verify an effect of the glucose concentration on the reaction product, inventors conducted a hydrothermal test in which reaction mixtures with different concentrations of glucose are treated at 140° C. for 4 hours. A specific test process is as follows:

First, in a 250 ml flask, 1.25 g glucose powder, 0.08 g catechol and 8 g aqueous dispersion of the silver nanowire with the pentagonal cross section (the mass percentage of the silver nanowire with the pentagonal cross section in the aqueous dispersion is 0.16%) are mixed with 80 g deionized water. Specifically, converted into a mass percentage, a mass percentage of the aqueous dispersion of the silver nanowire with the pentagonal cross section in the aqueous solution is 8.96%, a mass percentage of the glucose powder in the aqueous solution is 1.40%, the mass percentage of the catechol in the aqueous solution is 0.090%, and the mass percentage of deionized water in the aqueous solution is 89.56%, which is the mass percentages of various raw materials represented by C1.

Next, the reaction mixture is slowly stirred at the room temperature for 25 minutes until the solution is uniform.

Specifically, a stirring method may be a magnetic stirring, and the stirring method involved in the following experiment may also be the magnetic stirring, in order to avoid repetition, details are not be repeated here.

Then, three other reaction mixtures are prepared with different concentrations of the glucose powder, and the other steps are exactly the same as described above. Specifically, the masses of the glucose powder are respectively reduced to 0.9375 g, 0.625 g and 0.3125 g.

Secondly, each reaction solution is sealed in one 100 mL sealed polytetrafluoroethylene autoclave and heated at 140° C. for 4 h.

Next, after the heating, each reaction product is centrifugally washed three times with a rotation speed of 4500 RPM in deionized water.

Finally, the extinction spectrum of each reaction product is measured by an ultraviolet-visible spectrophotometer.

In FIG. 3, C1 represents that the mass of the glucose powder is 1.25 g, C2 represents that the mass of the glucose powder is 0.9375 g, C3 represents that the mass of the glucose powder is 0.625 g, C4 represents that the mass of the glucose powder is 0.3125 g, P represents that the silver nanowire with the pentagonal cross section. Converted into the mass percentage, C1 represents that the mass percentage of the glucose powder in the aqueous solution is 1.40%. C2 represents that the mass percentage of the glucose powder in the aqueous solution is 1.05%, the mass percentage of the aqueous dispersion of the silver nanowire with the pentagonal cross section in the aqueous solution is 8.99%, the mass percentage of the catechol in the aqueous solution is 0.09%, and the mass percentage of the deionized water in the aqueous solution is 89.87%. C3 represents that the mass percentage of the glucose powder in the aqueous solution is 0.70%, the mass percentage of the aqueous dispersion of the silver nanowire with the pentagonal cross section in the aqueous solution is 9.02%, the mass percentage of the catechol in the aqueous solution is 0.09%, and the mass percentage of the deionized water in the aqueous solution is 90.19%. C4 represents that the mass percentage of the glucose powder in the aqueous solution is 0.35%, the mass percentage of the aqueous dispersion of the silver nanowire with the pentagonal cross section in the aqueous solution is 9.05%, the mass percentage of the catechol in the aqueous solution is 0.09%, and the mass percentage of the deionized water in the aqueous solution is 90.51%.

According to the prior art, there are two resonance peaks in the ultraviolet-visible extinction spectrum of the silver nanowire with the pentagonal cross section, and the positions of the two resonance peaks are approximately at 350 nm and 370 nm respectively. In the ultraviolet-visible extinction spectrum of the silver nanowire with the circular cross section, there is one resonance peak, and the position of the resonance peak is approximately at 370 nm.

It can be seen in FIG. 3 that C1, C2, C3 and C4 have only one strong resonance peak at 372 nm, while P has two resonance peaks at 352 nm and 372 nm respectively. It can be seen that C1, C2, C3 and C4 all generate the silver nanowire with the circular cross section. It should be pointed out that, compared with C1, C2 and C3, an extinction intensity of C4 is very low, since when the mass of the glucose is reduced to a very low value, the silver nanowire will be deformed into silver nanoparticles. Therefore, when the mass percentage of the glucose is greater than 0.35%, it may be beneficial for the generation of the silver nanowire.

Figure 4:
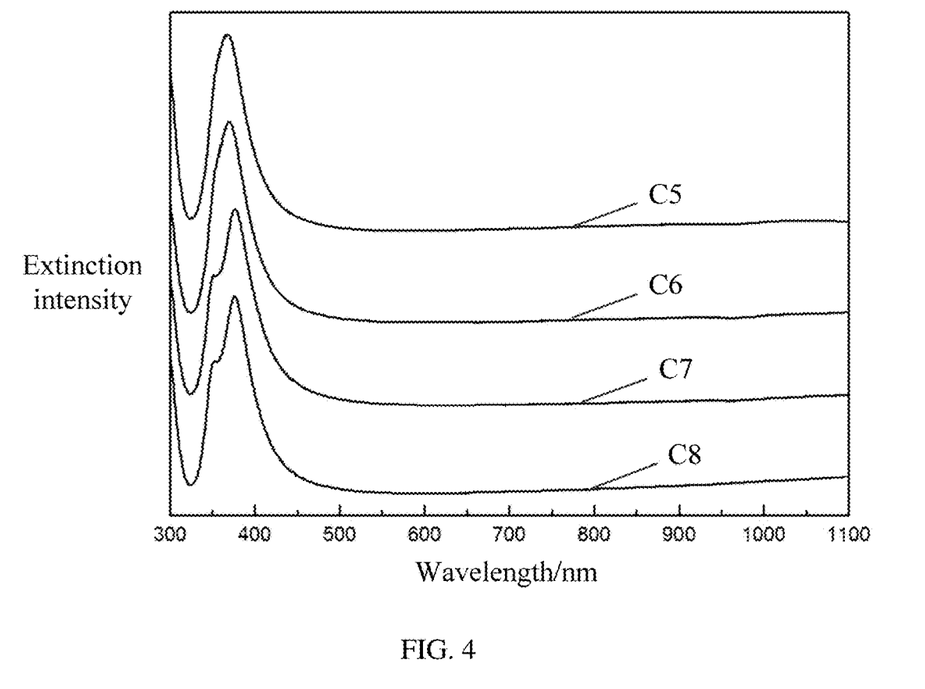
FIG. 4 is a schematic diagram of ultraviolet-visible extinction spectrums of reaction products of PVP with different concentrations.

FIG. 4 is a schematic diagram of ultraviolet-visible extinction spectrums of reaction products of PVP with different concentrations.

In order to verify an effect of PVP concentration on the reaction product, inventors conducted a hydrothermal test in which reaction mixtures with different concentrations of PVP are treated at 120° C. for 4 hours. A specific test process is as follows:

First, in a 250 ml flask, 1.25 g glucose powder, 0.08 g catechol and 8 g aqueous dispersion of the silver nanowire with the pentagonal cross section (the mass percentage of the silver nanowire with the pentagonal cross section in the aqueous dispersion is 0.16%) are mixed with 80 g deionized water.

Next, the reaction mixture is slowly stirred at the room temperature for 25 minutes until the solution is uniform.

Then, three other reaction mixtures are prepared with different concentrations of the PVP, and the other steps are exactly the same as described above. Specifically, the masses of PVP are 0.06 g, 0.12 g and 0.18 g respectively.

Secondly, each reaction solution is sealed in one 100 mL sealed polytetrafluoroethylene autoclave and heated at 120° C. for 4 h.

Next, after the heating, each reaction product is centrifugally washed three times with a rotation speed of 4500 RPM in deionized water.

Finally, the extinction spectrum of each reaction product is measured by an ultraviolet-visible spectrophotometer.

In FIG. 4, C5 represents that there is no PVP added, C6 represents that the mass of the PVP added is 0.06 g, C7 represents that the mass of the PVP added is 0.12 g, and C8 represents that the mass of the PVP added is 0.18 g. Converted into the mass percentage, C5 represents that the mass percentage of the water dispersion of the silver nanowire with the pentagonal cross section in the aqueous solution is 8.96%, the mass percentage of the glucose powder in the aqueous solution is 1.40%, the mass percentage of the catechol in the aqueous solution is 0.09%, the mass percentage of the deionized water in the aqueous solution is 89.56%, and the mass percentage of the polyvinylpyrrolidone in the aqueous solution is 0.00%. C6 represents that the mass percentage of the water dispersion of the silver nanowire with the pentagonal cross section in the aqueous solution is 8.95%, the mass percentage of the glucose powder in the aqueous solution is 1.40%, the mass percentage of the catechol in the aqueous solution is 0.09%, the mass percentage of the deionized water in the aqueous solution is 89.50%, and the mass percentage of the polyvinylpyrrolidone in the aqueous solution is 0.07%. C7 represents that the mass percentage of the water dispersion of the silver nanowire with the pentagonal cross section in the aqueous solution is 8.94%, the mass percentage of the glucose powder in the aqueous solution is 1.40%, the mass percentage of the catechol in the aqueous solution is 0.09%, the mass percentage of the deionized water in the aqueous solution is 89.44%, and the mass percentage of the polyvinylpyrrolidone in the aqueous solution is 0.13%. C8 represents that the mass percentage of the water dispersion of the silver nanowire with the pentagonal cross section in the aqueous solution is 8.94%, the mass percentage of the glucose powder in the aqueous solution is 1.40%, the mass percentage of the catechol in the aqueous solution is 0.09%, the mass percentage of the deionized water in the aqueous solution is 89.38%, and the mass percentage of the polyvinylpyrrolidone in the aqueous solution is 0.20%.

It can be seen in FIG. 4 that with the increase of the PVP concentration, the ultraviolet-visible extinction spectra of C7 and C8 still have two resonance peaks, which means that C7 and C8 are not the silver nanowires with the circular cross section. The result indicates that the PVP will passivate the surface of the silver nanowire with the pentagonal cross section and prevent the silver nanowire with the pentagonal cross section from transforming into the silver nanowire with the circular cross section.

Figure 5:
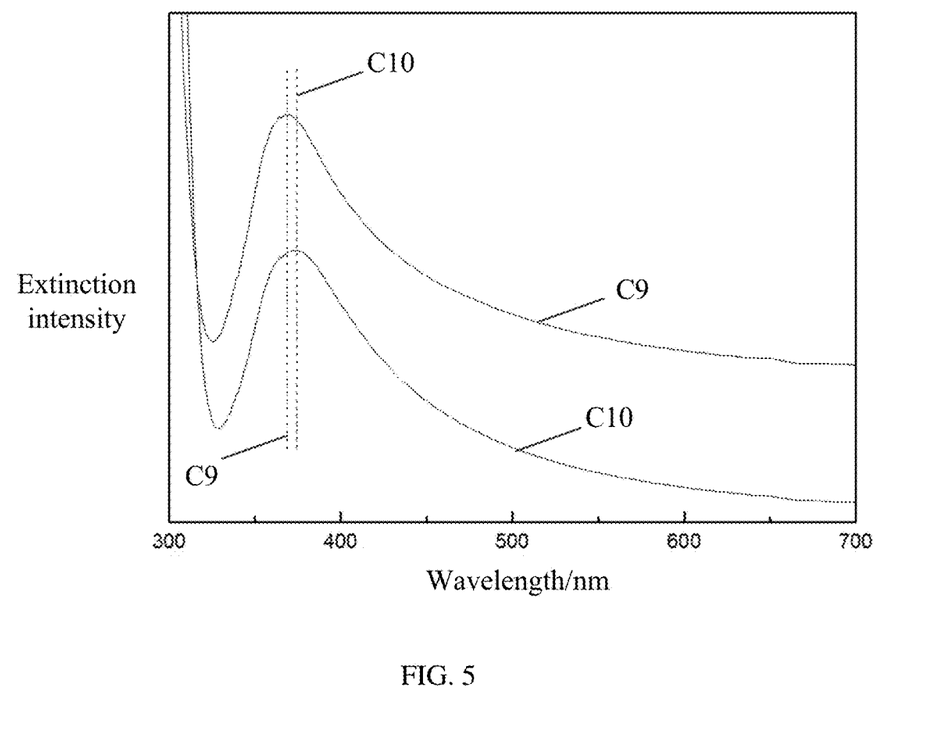
FIG. 5 is a schematic diagram of ultraviolet-visible extinction spectrums of reaction products of different reaction times.
Figure 6A:
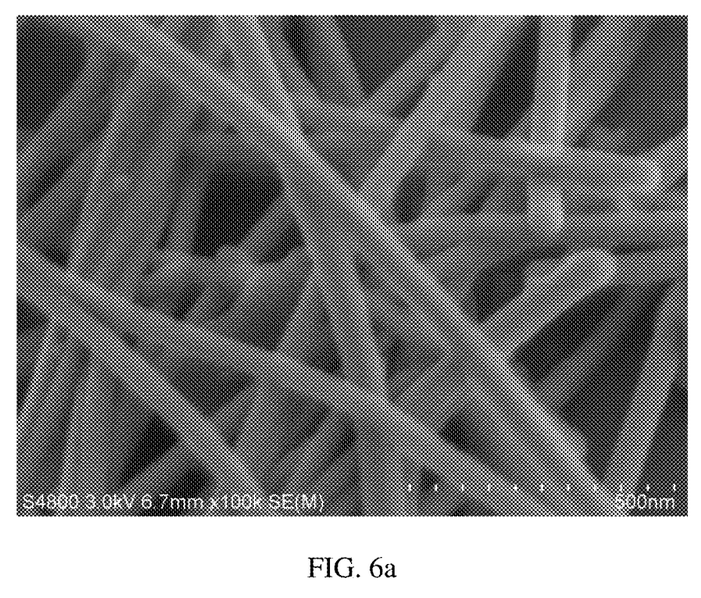
FIG. 6a is a schematic diagram of a Scanning Electron Microscope (SEM) image of silver nanowires with a circular cross section at a magnification of 100K times.
Figure 6B:
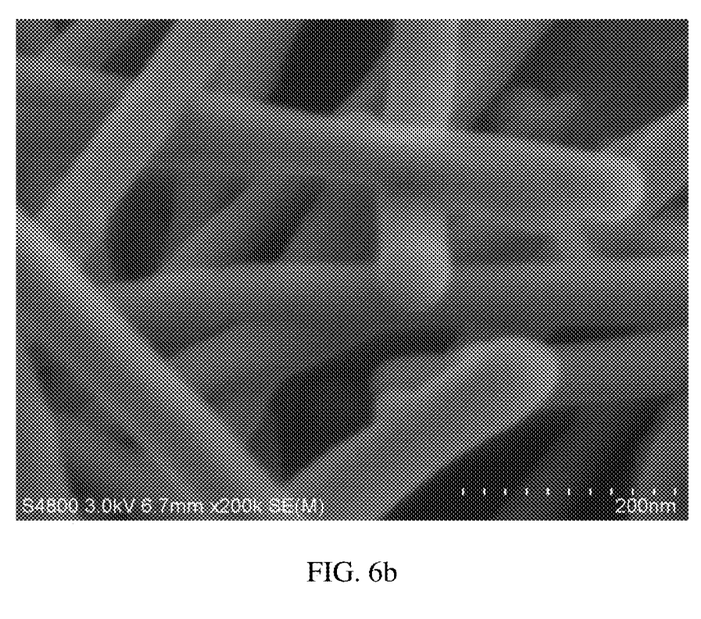
FIG. 6b is a schematic diagram of the SEM image of the silver nanowires with the circular cross section at a magnification of 200K times.

FIG. 5 is a schematic diagram of ultraviolet-visible extinction spectrums of reaction products of different reaction times. FIG. 6a is a schematic diagram of a Scanning Electron Microscope (SEM) image of silver nanowires with a circular cross section at a magnification of 100K times. FIG. 6b is a schematic diagram of the SEM image of the silver nanowires with the circular cross section at a magnification of 200K times.

In order to verify an effect of reaction time on the reaction product, inventors conducted a hydrothermal test in which reaction mixtures are treated with different reaction time at 160° C. A specific test process is as follows:

First, in a 500 ml flask, 2.5 g glucose powder, 0.16 g catechol and 16 g aqueous dispersion of the silver nanowire with the pentagonal cross section (the mass percentage of the silver nanowire with the pentagonal cross section in the aqueous dispersion is 0.16%) are mixed with 160 g deionized water.

Next, the reaction mixture is slowly stirred at the room temperature for 25 minutes until the solution is uniform.

Then, the reaction solution is divided into two identical parts which are sealed in two 100 mL sealed polytetrafluoroethylene autoclaves respectively.

Next, one autoclave is heated at 160° C. for 2 h, and the other autoclave is heated at 160° C. for 4 h.

Next, after the heating, each reaction product is centrifugally washed three times with a rotation speed of 4500 RPM in deionized water.

Finally, the extinction spectrum of each reaction product is measured by an ultraviolet-visible spectrophotometer.

In FIG. 5, C9 represents the reaction mixture being reacted at 160° C. for 2 hours, and C10 represents the reaction mixture being reacted at 160° C. for 4 hours. Converted into the mass percentage, C9 and C10 both represent the mass percentage of the water dispersion of the silver nanowire with the pentagonal cross section in the aqueous solution is 8.96%, the mass percentage of the glucose powder in the aqueous solution is 1.40%, the mass percentage of the catechol in the aqueous solution is 0.09%, the mass percentage of the deionized water in the aqueous solution is 89.56%.

It can be seen in FIG. 5 that the only one strong resonance peak of the silver nanowire with the circular cross section will occur red-shift with the increase of the reaction time. The strong resonance peak of C9 is 371.0 nm and the strong resonance peak of C10 is 375.5 nm. The morphology of the silver nanowires with the circular cross section is shown in FIG. 6a and FIG. 6b.

Figure 7A:
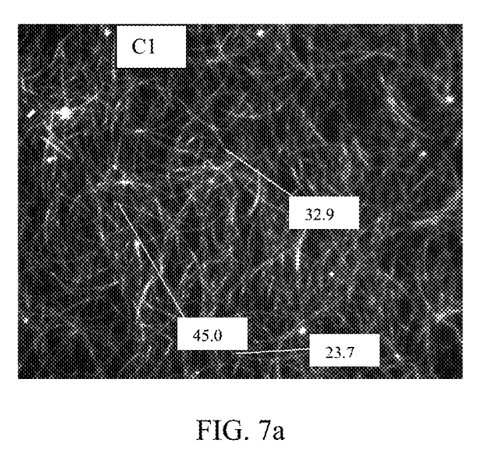
FIG. 7a, FIG. 7b and FIG. 7c are schematic diagrams of optical microscope images of reaction products of different concentrations of catechol.
Figure 7B:
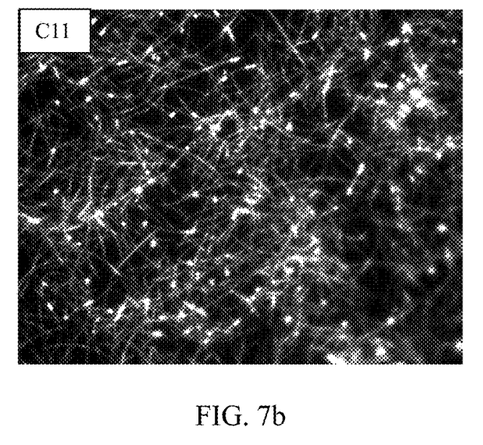
Figure 7C:
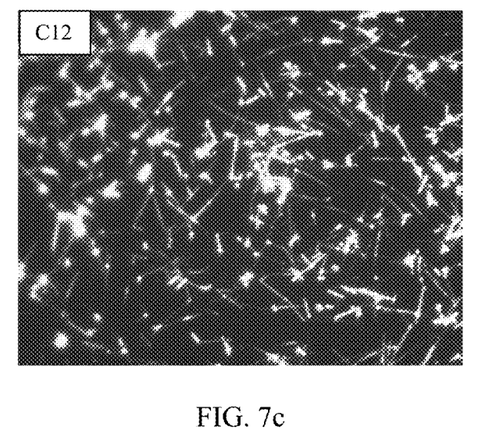

FIG. 7a, FIG. 7b and FIG. 7c are schematic diagrams of optical microscope images of reaction products of different concentrations of catechol.

In order to verify an effect of the catechol concentration on the reaction product, inventors conducted a hydrothermal test in which reaction mixtures with different concentrations of the catechol are treated at 140° C. for 4 hours. A specific test process is as follows:

First, in a 250 ml flask, 1.25 g glucose powder, 0.08 g catechol and 8 g aqueous dispersion of the silver nanowire with the pentagonal cross section (the mass percentage of the silver nanowire with the pentagonal cross section in the water dispersion is 0.16%) are mixed with 80 g deionized water.

Next, the reaction mixture is slowly stirred at the room temperature for 25 minutes until the solution is uniform.

Then, a reaction mixture that does not contain the catechol is prepared, and the other steps were exactly the same as described above.

Secondly, the reaction solution is sealed in two 100 mL sealed polytetrafluoroethylene autoclaves and heated at 140° C. for 4 h.

Next, after the heating, each reaction product is centrifugally washed three times with a rotation speed of 4500 RPM in deionized water.

Finally, the morphology of each reaction product is observed through a metallurgical microscope.

In FIG. 7a, FIG. 7b and FIG. 7c, C1 represents that the mass of the catechol added is 0.08 g, C11 represents that the mass of the catechol added is 0.008 g, and C12 represents that there is no catechol added. Converted into the mass percentage, C11 represents that the mass percentage of the aqueous dispersion of the silver nanowire with the pentagonal cross section in the aqueous solution is 8.96%, the mass percentage of the glucose powder in the aqueous solution is 1.40%, the mass percentage of the catechol in the aqueous solution is 0.01%, and the mass percentage of the deionized water in the aqueous solution is 89.63%. C12 represents that the mass percentage of the aqueous dispersion of the silver nanowire with the pentagonal cross section in the aqueous solution is 8.96%, the mass percentage of the glucose powder in the aqueous solution is 1.40%, the mass percentage of the catechol in the aqueous solution is 0.00%, and the mass percentage of the deionized water in the aqueous solution is 89.64%.

It can be seen in FIG. 7a, FIG. 7b and FIG. 7c that when the concentration of the catechol decreases, the silver nanowire will be decomposed into shorter silver nanowires or silver nanoparticles.

In order to verify an optical property of the silver nanowire with the pentagonal cross section and the silver nanowire with the circular cross section, the inventors conducted the following optical tests:

First, a viscous aqueous solution is prepared by adding hydroxypropyl methylcellulose in the deionized water.

Secondly, the silver nanowire with the pentagonal cross section and the silver nanowire with the circular cross section are dispersed in the aforementioned aqueous solution to obtain a conductive ink.

Next, the conductive ink is rotating coated on a clean Polyethylene Terephthalate (PET) substrate and dried at 100° C. for 5 minutes.

Finally, two kinds of PET conductive films are tested for optical performance, and the results are shown in the following table:

| PET conductive film Number | Silver nanowire Types | Silver nanowire Content | Haze (%) | Transmittance (%) |
|---|---|---|---|---|
| 1 | Silver nanowires with the circular cross section | 0.144% | 1.55 | 89.42 |
| 2 | Silver nanowires with the pentagonal cross section | 0.144% | 2.33 | 88.27 |

It can be seen from the above table that the silver nanowires with the circular cross section have lower haze and higher transmittance compared with the silver nanowires with the pentagonal cross section. Therefore, the silver nanowires with the circular cross section have better optical properties than the silver nanowires with the pentagonal cross section.

Those descriptions above are merely preferred embodiments of the present application, and are not used for limiting the protection scope of the present application. Any modification, equivalent substitution, improvement, etc. made within the spirit and principles of the present invention shall be included in the protection scope of the present invention.

What is claimed is:

1. A preparation method of a silver nanowire with a circular cross section, comprising:
   mixing a silver nanowire with a pentagonal cross section, a reducing sugar, an oxygen reducing agent and water uniformly to form an aqueous solution; and
   heating the aqueous solution at a preset temperature for a preset time to form a reaction product comprising the silver nanowire with the circular cross section, wherein the preset temperature is between 120° C. and 160° C.; and the preset time is between 2 hours and 8 hours.

2. The preparation method according to claim 1, wherein a mass percentage of the silver nanowire with the pentagonal cross section in the aqueous solution is between 0.001% and 16%; and/or
   an aspect ratio of the silver nanowire with the pentagonal cross section is greater than 10.

3. The preparation method according to claim 1, wherein a mass percentage of the silver nanowire with the pentagonal cross section in the aqueous solution is between 0.008% and 0.032%.

4. The preparation method according to claim 1, wherein a diameter of the silver nanowire with the pentagonal cross section is between 18 nm and 100 nm, and a length of the silver nanowire with the pentagonal cross section is between 5 um and 100 um.

5. The preparation method according to claim 1, wherein a surface of the silver nanowire with the pentagonal cross section is coated with polyvinylpyrrolidone; or
   the mixing a silver nanowire with a pentagonal cross section, a reducing sugar, an oxygen reducing agent and water uniformly comprises: mixing the silver nanowire with the pentagonal cross section, the reducing sugar, the oxygen reducing agent, polyvinylpyrrolidone and the water uniformly.

6. The preparation method according to claim 5, wherein a thickness of the polyvinylpyrrolidone coated on the surface of the silver nanowire with the pentagonal cross section is between 1 nm and 5 nm.

7. The preparation method according to claim 1, wherein the reducing sugar comprises at least one of glucose, fructose, ribose, sucrose, maltose, and lactose.

8. The preparation method according to claim 1, wherein a mass percentage of the reducing sugar in the aqueous solution is between 0.1% and 35%.

9. The preparation method according to claim 1, wherein a mass percentage of the reducing sugar in the aqueous solution is between 0.35% and 3.5%.

10. The preparation method according to claim 1, wherein the oxygen reducing agent comprises catechol.

11. The preparation method according to claim 1, wherein a mass percentage of the oxygen reducing agent in the aqueous solution is between 0.01% and 1%.

12. The preparation method according to claim 1, wherein the reaction product is produced in an autoclave.

13. The preparation method according to claim 12, wherein a lining material of the autoclave is polytetrafluoroethylene.

14. The preparation method according to claim 1, wherein the preset temperature is 120° C., 140° C. or 160° C.

15. The preparation method according to claim 1, wherein the preset time is 2 hours or 4 hours.

16. The preparation method according to claim 1, wherein the silver nanowire with the pentagonal cross section is an aqueous dispersion, and a mass percentage of the silver nanowire with the pentagonal cross section in the aqueous dispersion is 0.16%; wherein
   a mass percentage of the aqueous dispersion of the silver nanowire with the pentagonal cross section in the aqueous solution is 8.96%, a mass percentage of the reducing sugar in the aqueous solution is 1.40%, a mass percentage of the oxygen reducing agent in the aqueous solution is 0.09%, a mass percentage of the water in the aqueous solution is 89.56%, the preset temperature is 140° C. or 120° C., and the preset time is 4 hours; or the mass percentage of the aqueous dispersion of the silver nanowire with the pentagonal cross section in the aqueous solution is 8.99%, the mass percentage of the reducing sugar in the aqueous solution is 1.05%, the mass percentage of the oxygen reducing agent in the aqueous solution is 0.09%, the mass percentage of the water in the aqueous solution is 89.87%, the preset temperature is 140° C., and the preset time is 4 hours; or the mass percentage of the aqueous dispersion of the silver nanowire with the pentagonal cross section in the aqueous solution is 9.02%, the mass percentage of the reducing sugar in the aqueous solution is 0.70%, the mass percentage of the oxygen reducing agent in the aqueous solution is 0.09%, the mass percentage of the water in the aqueous solution is 90.19%, the preset temperature is 140° C., and the preset time is 4 hours; or the mass percentage of the aqueous dispersion of the silver nanowire with the pentagonal cross section in the aqueous solution is 9.05%, the mass percentage of the reducing sugar in the aqueous solution is 0.35%, the mass percentage of the oxygen reducing agent in the aqueous solution is 0.09%, the mass percentage of the water in the aqueous solution is 90.51%, the preset temperature is 140° C., and the preset time is 4 hours; or the mixing a silver nanowire with a pentagonal cross section, a reducing sugar, an oxygen reducing agent and water uniformly comprises: mixing the aqueous dispersion of the silver nanowire with the pentagonal cross section, the reducing sugar, the oxygen reducing agent, polyvinylpyrrolidone and the water uniformly, wherein the mass percentage of the aqueous dispersion of the silver nanowire with the pentagonal cross section in the aqueous solution is 8.95%, the mass percentage of the reducing sugar in the aqueous solution is 1.40%, the mass percentage of the oxygen reducing agent in the aqueous solution is 0.09%, the mass percentage of the water in the aqueous solution is 89.50%, the mass percentage of the polyvinylpyrrolidone in the aqueous solution is 0.07%, the preset temperature is 120° C., and the preset time is 4 hours; or the mass percentage of the aqueous dispersion of the silver nanowire with the pentagonal cross section in the aqueous solution is 8.96%, the mass percentage of the reducing sugar in the aqueous solution is 1.40%, the mass percentage of the oxygen reducing agent in the aqueous solution is 0.09%, the mass percentage of the water in the aqueous solution is 89.56%, the preset temperature is 160° C., and the preset time is 2 hours or 4 hours; or the mass percentage of the aqueous dispersion of the silver nanowire with the pentagonal cross section in the aqueous solution is 8.96%, the mass percentage of the reducing sugar in the aqueous solution is 1.40%, the mass percentage of the oxygen reducing agent in the aqueous solution is 0.01%, the mass percentage of the water in the aqueous solution is 89.63%, the preset temperature is 140° C., and the preset time is 4 hours.

17. The preparation method according to claim 1, further comprising:
cooling the reaction product.

18. The preparation method according to claim 17, wherein a method for cooling is a natural cooling in the air.

19. The preparation method according to claim 1, further comprising:
washing the reaction product.

20. The preparation method according to claim 19, wherein a method for washing is centrifugal washing, in which a solution is a deionized water, a rotation speed of the centrifugal washing is 4500 RPM, and the centrifugal washing is performed for three times.

* * * * *